G. A. LUTZ.
PIPE CLEANING APPARATUS.
APPLICATION FILED OCT. 10, 1908.

939,608.

Patented Nov. 9, 1909.
2 SHEETS—SHEET 1.

Witnesses:
C. W. Benjamin
Maria G. Wainright

Inventor
George A. Lutz
By his Attorney
T. F. Bourne

G. A. LUTZ.
PIPE CLEANING APPARATUS.
APPLICATION FILED OCT. 10, 1908.

939,608.

Patented Nov. 9, 1909.
2 SHEETS—SHEET 2.

Witnesses:

Inventor
George A. Lutz.
By his Attorney
T. F. Bourne

UNITED STATES PATENT OFFICE.

GEORGE A. LUTZ, OF PLAINFIELD, NEW JERSEY, ASSIGNOR TO AMERICAN CIRCULAR LOOM COMPANY, OF PORTLAND, MAINE, A CORPORATION OF MAINE.

PIPE-CLEANING APPARATUS.

939,608.      Specification of Letters Patent.      Patented Nov. 9, 1909.

Application filed October 10, 1908. Serial No. 457,059.

*To all whom it may concern:*

Be it known that I, GEORGE A. LUTZ, a citizen of the United States, and resident of Plainfield, in the county of Union and State of New Jersey, have invented certain new and useful Improvements in Pipe-Cleaning Apparatus, of which the following is a specification.

The object of my invention is to provide improved means for removing scale from and cleaning the interior of pipes and tubes, to the end that the interior of the latter may be properly and efficiently coated or lined with suitable insulation or be electroplated.

In carrying out my invention I provide a suitable receptacle or tank over which I support a suitable pan or receptacle for abrading or scouring material, such as sand, fine emery and the like, which pan or receptacle is provided with outlets in line with which pipes or tubes to be cleaned are located, and through such pipes or tubes I pass scouring devices such as wire ropes, brushes, or the like, which co-act with the sand or the like passing through the pipes to clean the inner surfaces of the latter, and I revolve or reciprocate said scouring devices within said pipes or tubes, or I may simultaneously revolve and reciprocate said scouring device within said pipes or tubes, all whereby said scouring devices in conjunction with the sand or gritty matter flowing through the pipes will clean the interiors thereof and remove scale or other substances therefrom.

My invention also comprises the novel details of improvement and combinations of parts that will be more fully hereinafter set forth and then pointed out in the claims.

Figure 1:
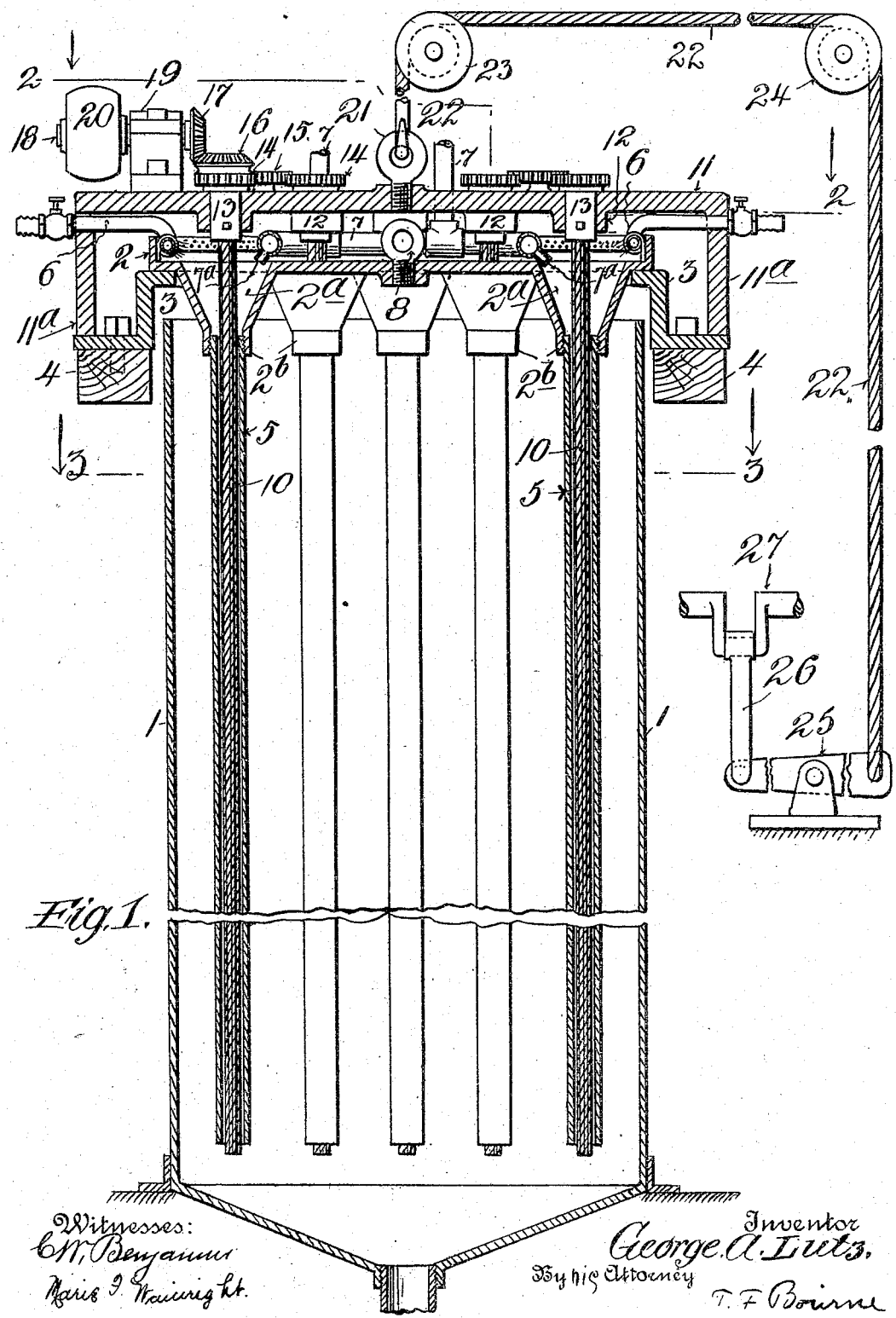
Figure 2:
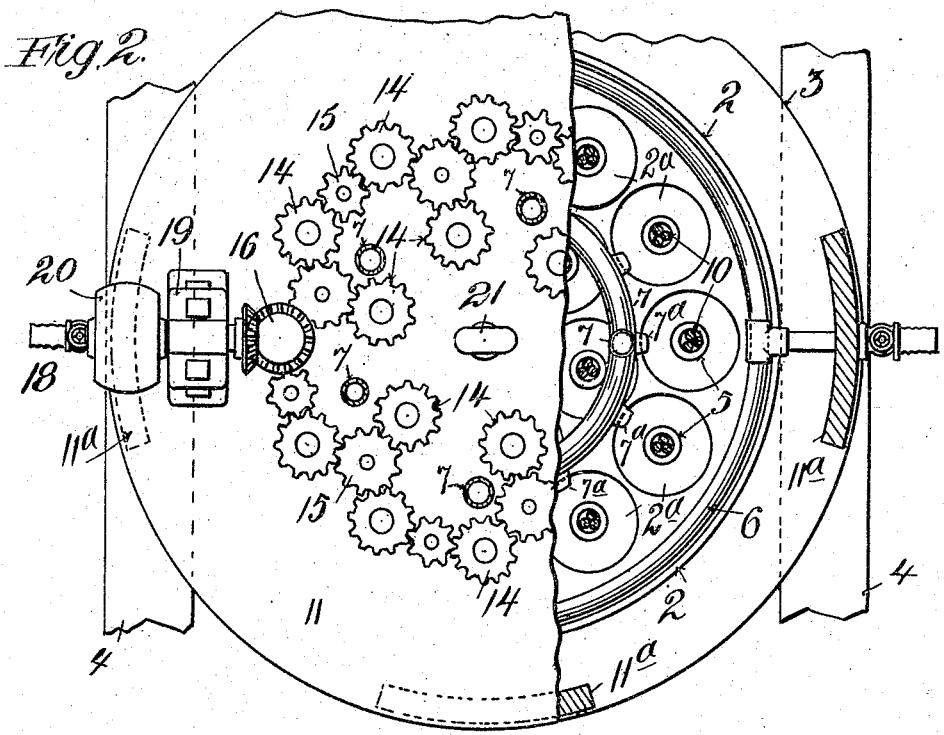
Figure 3:
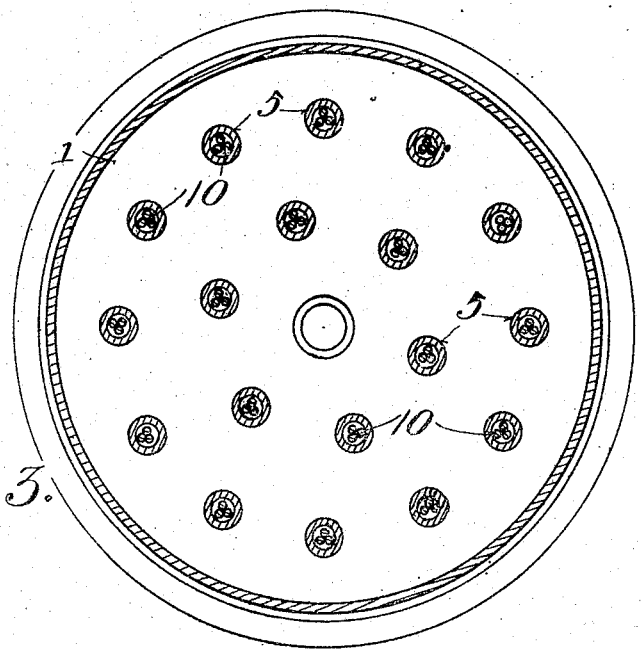

Reference is to be had to the accompanying drawings forming part hereof, wherein, Figure 1 is a vertical section of a pipe cleaning machine, embodying my invention; Fig. 2 is a partly broken plan view thereof, taken on the line 2, 2, in Fig. 1, and Fig. 3 is a section on the line 3, 3, in Fig. 1.

Similar numerals of reference indicate corresponding parts in the several views.

In the accompanying drawings the numeral 1 indicates a suitable receptacle or tank, and at 2 is a pan or the like located above said tank, and shown resting upon supports or brackets 3 which may be supported by means 4 or in any other suitable manner. Said pan or receptacle is provided with one or more outlets which in the example illustrated are shown in funnel-like form at $2^a$, having hubs $2^b$ at their lower ends receiving threads at the ends of pipes or tubes 5 whose inner surfaces are to be cleaned, the bores of said pipes thus communicating with the outlets of pan 2, whereby said pipes depend into tank 1, with their lower ends at a suitable distance above the bottom of the tank. Water or oil and sand, emery or the like are to be deposited within pan 2, which may be done in any suitable manner as by means of a pipe 6 for the water or oil and a pipe 7, preferably having spouts or nozzles $7^a$ leading to funnels $2^a$, which pipe may be connected with any suitable blower or other forcing means, for the sand, emery or the like, whereby the water and abrading material will form a mixture and will flow into the pipes 5. Pan 2 is shown provided with an eye 8 whereby the same, with the attached pipes, may be lifted from or deposited over and within tank 1, as by means of a suitable crane or lifting device, connected with eye 8 by a rope.

At 10 are scouring devices which may be in the form of wire rope, brushes or other suitable means adapted to act upon the surface of pipes or tubes 5 to scour the same in conjunction with the abrading material flowing therethrough. I have shown a plate or support 11 from which the scouring devices 10 depend, which plate is adapted to be supported over pan 2, so that the ropes or the like 10 may register with and pass through the pipes or tubes 5. I have shown plate 11 provided with hubs 12 receiving shafts or the like 13 from which the ropes 10 depend into the corresponding funnel-like openings of pan 2, the ropes being secured to said shafts. Said shafts are shown provided with gears 14 for rotating the scouring devices 10, and to rotate all of the latter simultaneously in the same direction, idle gears 15 are shown interposed between corresponding gears 14. Said gears may be rotated in any suitable manner. For this purpose I have shown a gear 16 connected with one of the shafts 13 and meshing with a driving gear 17 shown carried by a shaft 18 supported in suitable bearings 19 upon plate 11, a pulley, motor, or other driving device 20 being provided to rotate shaft 18 and gear 17. Plate 11 is shown provided with an eye 21 by which said plate and the attached scouring devices 10 and the gears may be raised and lowered by any suitable means, such as by a rope 22 operated by a crane. In addition to rotating the scouring devices 10 within pipes 5 said devices may be simultaneously reciprocated, or said devices may be reciprocated without simultaneous rotation if desired. Any suitable means may be provided for reciprocating the devices 10. For such purpose I have shown the rope 22 passing over a sheave 23 suitably supported, the rope also passing over a sheave 24 and connected with a rocking arm 25 that may be rocked in any suitable manner, such as by a link 26 connecting said arm with a crank 27, supported and operated in any suitable manner.

In using my improvements the pan 2 with its attached pipes 5 is placed in position over tank 1, and the cleaning devices 10 are lowered into and through said pipes, plate 11 being supported in any suitable manner, as by arms 11ª supported by beams 4, and the abrading material—the water or oil and the sand, emery or the like—are delivered upon pan 2 and pass thence down through the funnels 2ª into and through pipes 5, and during such time the cleaning devices 10 are rotated, or reciprocated, or rotated and reciprocated, as desired.

The action of the cleaning devices in conjunction with the abrading material will remove the scale and other matter adhering to the interior of the pipes or tubes, the abrading material gradually working its way down through the pipes or tubes and being deposited in the bottom of tank 1 from whence it may flow or be removed as desired. By using wire rope for the cleaning devices the spirally disposed strands will tend to cause the abrading material to be pushed downward through and against the walls of the pipes or tubes and will also act in the manner of a screw against the walls with which such strands come in contact.

When the pipes or tubes have been cleaned it is merely necessary to lift the cleaning devices out from the pipes and swing them to one side, then remove pan 2, detach the cleaned pipes and apply new pipes to be cleaned, lower the latter into the tank, then apply the cleaning devices within the pipes, and supply abrading material, and operate as desired.

While provision may be made for cleaning a single pipe in the manner set forth, the arrangements are such that a relatively large number of pipes may simultaneously be cleaned in a single tank, whereby the cost of cleaning pipes is reduced.

While I have illustrated and described a construction suitable for carrying out my invention it will be understood that my invention is not limited to the details of construction and arrangements set forth, for the same may be varied within the scope of my invention without departing from the appended claims.

Having now described my invention what I claim is:

1. A pipe or tube cleaning apparatus comprising means to supply abrading material to the interior of a pipe, a cleaning device within such pipe, and means to rotate said device within the pipe.

2. A pipe or tube cleaning apparatus comprising means to sustain a pipe in vertical position with both ends open, means to supply abrading material to the interior of a pipe through the upper end, a cleaning device within such pipe, and means to reciprocate said device within the pipe.

3. A pipe or tube cleaning apparatus comprising means to supply abrading material to the interior of a pipe, a cleaning device within such pipe, and means to rotate and simultaneously reciprocate said device within the pipe.

4. A pipe cleaning apparatus comprising a tank, a pan provided with an opening, a pipe secured in alinement with said pan, a cleaning device to pass through said pipe, and means to rotate said cleaning device.

5. A pipe cleaning apparatus comprising a tank, a pan provided with an opening, a pipe secured in alinement depending from and communicating with said opening, a suspended cleaning device to pass through said pipe, and means to reciprocate said device within the pipe.

6. A pipe cleaning apparatus comprising a tank, a pan provided with an opening, a pipe secured in alinement with said pan, a cleaning device to pass through said pipe and means to rotate and simultaneously reciprocate said device within the pipe.

7. A pipe cleaning apparatus comprising a tank, a pan provided with a plurality of outlets located over the tank, means to secure pipes in line with said outlets, means to supply said tank with abrading material, cleaning devices supported in line with and passing through said outlets into the pipes, and means for rotating said cleaning devices.

8. A pipe cleaning apparatus comprising a tank, a pan provided with a plurality of outlets located over the tank, means to secure pipes in line with said outlets, means to supply said tank with abrading material, to flow through said outlets into the pipes, cleaning devices supported in line with and passing through said outlets into the pipes, and means to reciprocate said cleaning devices within the pipes.

9. A pipe cleaning apparatus comprising a tank, a pan provided with a plurality of outlets located over the tank, means to secure pipes in line with said outlets, means to supply said tank with abrading material, cleaning devices supported in line with and passing through said outlets into the pipes, and means to rotate and simultaneously reciprocate said devices within the pipes.

10. A pipe cleaning apparatus comprising a tank, a pan located over the same and provided with a plurality of depending funnel-like outlets, means to secure pipes in line with said outlets, means to supply abrading material to said pan, a plate removably supported over said pan, cleaning devices carried by said plate in position to pass through the outlets of said pan and into said pipes, and means to operate said cleaning devices relatively to said pipes.

11. A pipe cleaning apparatus comprising a tank, a pan located over the same and provided with a plurality of depending funnel-like outlets, means to secure pipes in line with said outlets, means to supply abrading material to said pan, a plate removably supported over said pan, cleaning devices carried by said plate in position to pass through the outlets of said pan and into said pipes, gears connected with said cleaning devices, and means to operate said gears to simultaneously rotate said cleaning devices.

12. A pipe cleaning apparatus comprising a tank, a pan located over the same and provided with a plurality of depending funnel-like outlets, means to secure pipes in line with said outlets, means to supply abrading material to said pan, a plate removably supported over said pan, cleaning devices carried by said plate in position to pass through the outlets of said pan and into said pipes, gears connected with said cleaning devices, and means to operate said gears to simultaneously rotate said cleaning devices, and means for movably supporting said plate for lifting the same from over said pan.

13. A pipe cleaning apparatus comprising a tank, a pan located over the same and provided with a plurality of depending funnel-like outlets, means to secure pipes in line with said outlets, means to supply abrading material to said pan, a plate removably supported over said pan, cleaning devices carried by said plate in position to pass through the outlets of said pan and into said pipes, gears connected with said cleaning devices, a rope connected with said pan, and means for reciprocating said rope.

Signed at New York city, in the county of New York and State of New York, this 7th day of October, A. D. 1908.

GEORGE A. LUTZ.

Witnesses:
T. F. BOURNE,
MARIE F. WAINRIGHT.